United States Patent
Ho et al.

(10) Patent No.: US 10,934,007 B2
(45) Date of Patent: Mar. 2, 2021

(54) PRESSURE OPTIMIZED SOURCING OF CABIN PRESSURIZATION AND COMPONENT AIR COOLING

(71) Applicant: Hamilton Sundstrand Corporation, Charlotte, NC (US)

(72) Inventors: Tony Ho, Glastonbury, CT (US); Alan Retersdorf, Avon, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 181 days.

(21) Appl. No.: 16/029,084

(22) Filed: Jul. 6, 2018

(65) Prior Publication Data
US 2020/0010203 A1 Jan. 9, 2020

(51) Int. Cl.
*B64D 13/08* (2006.01)
*B64D 13/04* (2006.01)
*F02C 6/08* (2006.01)
*B64D 13/06* (2006.01)

(52) U.S. Cl.
CPC .............. *B64D 13/08* (2013.01); *B64D 13/04* (2013.01); *F02C 6/08* (2013.01); *B64D 2013/0618* (2013.01)

(58) Field of Classification Search
CPC .... B64D 2013/0611; B64D 2013/0618; B64D 2013/0648; B64D 2013/0662; B64D 2013/0688; B64D 13/08; B64D 13/06; B64D 13/02; B64D 2013/0685
See application file for complete search history.

(56) References Cited

U.S. PATENT DOCUMENTS

| | | | |
|---|---|---|---|
| 2,557,099 A | 6/1951 | Green | |
| 3,177,676 A * | 4/1965 | Abrahams | B64D 13/06 62/172 |
| 4,430,867 A * | 2/1984 | Warner | B60H 1/32 62/172 |
| 5,461,882 A | 10/1995 | Zywiak et al. | |
| 6,449,963 B1 | 9/2002 | Ng et al. | |
| 8,571,726 B2 | 10/2013 | Gray et al. | |
| 9,376,212 B2 | 6/2016 | Liebich | |
| 9,656,756 B2 | 5/2017 | Atkey | |
| 9,669,936 B1 | 6/2017 | Fiterman et al. | |
| 2009/0084896 A1 | 4/2009 | Boucher et al. | |
| 2011/0259546 A1 | 10/2011 | Defrancesco et al. | |

(Continued)

FOREIGN PATENT DOCUMENTS

WO 9112990 A1 9/1991

OTHER PUBLICATIONS

European Search Report Issued in EP Application No. 19184650.0, dated Nov. 12, 2019, 8 Pages.

*Primary Examiner* — Frantz F Jules
*Assistant Examiner* — Lionel Nouketcha
(74) *Attorney, Agent, or Firm* — Cantor Colburn LLP

(57) ABSTRACT

An environmental control system (ECS) for an aircraft includes at least one cooling turbine, and a turbine bypass valve disposed fluidly upstream of the at least one cooling turbine. The turbine bypass valve is configured to direct a first portion of an ECS output airflow to a first air load at a first pressure via a first outlet passage, and direct a second portion of the ECS output airflow across a cooling turbine of the at least one cooling turbine and to a second air load at a second pressure lower than the first pressure for cooling thereof.

13 Claims, 2 Drawing Sheets

(56) References Cited

U.S. PATENT DOCUMENTS

| | | | |
|---|---|---|---|
| 2015/0059397 A1* | 3/2015 | Bruno | B64D 13/06 62/402 |
| 2015/0345341 A1* | 12/2015 | Kacludis | F02C 1/04 60/671 |
| 2016/0047561 A1* | 2/2016 | Army, Jr. | B23P 15/26 62/498 |
| 2016/0083100 A1* | 3/2016 | Bammann | B64D 13/06 62/89 |
| 2017/0086335 A1 | 3/2017 | Morioka et al. | |

* cited by examiner

PRESSURE OPTIMIZED SOURCING OF CABIN PRESSURIZATION AND COMPONENT AIR COOLING

STATEMENT OF FEDERAL SUPPORT

This invention was made with Government support under contract D6004-F3359-3359-2410001 awarded by the United States Air Force. The Government has certain rights in the invention.

BACKGROUND

Exemplary embodiments pertain to the art of aircraft environmental control systems (ECSs), and in particular to ECSs having an air cycle machine and distribution of cooling airflow therefrom.

Many aircraft utilize ECS configurations to provide conditioned air to fulfill the functions of providing pressurization to a cockpit/cabin area of the aircraft and for cooling components such as avionics or other electronics of the aircraft. While pressurization of the conditioned air is needed for the cockpit/cabin areas, the airflow for component cooling may not require pressurization. Providing pressurized airflow from the ECS when it is not necessary is less than optimal operation of the ECS and reduces system cooling capacity, or alternatively requires the usage of larger and higher weight heat exchangers than is necessary.

BRIEF DESCRIPTION

In one embodiment, an environmental control system (ECS) for an aircraft includes at least one cooling turbine, and a turbine bypass valve disposed fluidly upstream of the at least one cooling turbine. The turbine bypass valve is configured to direct a first portion of an ECS output airflow to a first air load at a first pressure via a first outlet passage, and direct a second portion of the ECS output airflow across a cooling turbine of the at least one cooling turbine and to a second air load at a second pressure lower than the first pressure for cooling thereof.

Additionally or alternatively, in this or other embodiments an outlet heat exchanger is located fluidly downstream of the cooling turbine of the at least one cooling turbine.

Additionally or alternatively, in this or other embodiments the first portion of the ECS output airflow and the second portion of the ECS output airflow are directed through the outlet heat exchanger to cool the first portion of the ECS output airflow.

Additionally or alternatively, in this or other embodiments the turbine bypass valve is disposed at a fluid pathway between a first cooling turbine and a second cooling turbine of the ECS.

Additionally or alternatively, in this or other embodiments a condensing heat exchanger is located on the fluid pathway between the first cooling turbine and the second cooling turbine.

Additionally or alternatively, in this or other embodiments a compressor is arranged on a common shaft with the first cooling turbine.

Additionally or alternatively, in this or other embodiments the first air load is an aircraft cabin.

In another embodiment, an environmental control system (ECS) includes a primary heat exchanger, a secondary heat exchanger, and an air cycle machine including a compressor and two or more cooling turbines. The compressor is fluidly coupled to an outlet of the primary heat exchanger and an inlet of the secondary heat exchanger. An outlet of the secondary heat exchanger is fluidly coupled to a first cooling turbine or the two or more cooling turbines. A turbine bypass valve is located fluidly upstream of a second cooling turbine of the two or more cooling turbines. The turbine bypass valve is configured to direct a first portion of an ECS output airflow to a first air load at a first pressure via a first outlet passage, and direct a second portion of the ECS output airflow across the second cooling turbine and to a second air load at a second pressure less than the first pressure for cooling thereof.

Additionally or alternatively, in this or other embodiments an outlet heat exchanger is located fluidly downstream of the second cooling turbine.

Additionally or alternatively, in this or other embodiments the first portion of the ECS output airflow and the second portion of the ECS output airflow are directed through the outlet heat exchanger to cool the first portion of the ECS output airflow.

Additionally or alternatively, in this or other embodiments the turbine bypass valve is located at a fluid pathway between the first cooling turbine and a second cooling turbine of the ECS.

Additionally or alternatively, in this or other embodiments a condensing heat exchanger is located on the fluid pathway between the first cooling turbine and the second cooling turbine.

Additionally or alternatively, in this or other embodiments the compressor, the first cooling turbine and the second cooling turbine are arranged on a common shaft.

Additionally or alternatively, in this or other embodiments the first air load is an aircraft cabin.

In yet another embodiment, a method of operating an environmental control system (ECS) of an aircraft includes flowing a bleed airflow through a first cooling turbine of an air cycle machine to cool the bleed airflow, outputting a first portion of the bleed airflow as a first portion of an ECS output airflow to a first air load at a first pressure via a first outlet passage by bypassing a second cooling turbine of the air cycle machine, and flowing a second portion of the bleed airflow across the second cooling turbine, thereby expanding the second portion of the bleed airflow. The second portion of the bleed airflow is output as a second portion of the ECS output airflow to a second air load at a second pressure less than the first pressure via a second outlet passage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
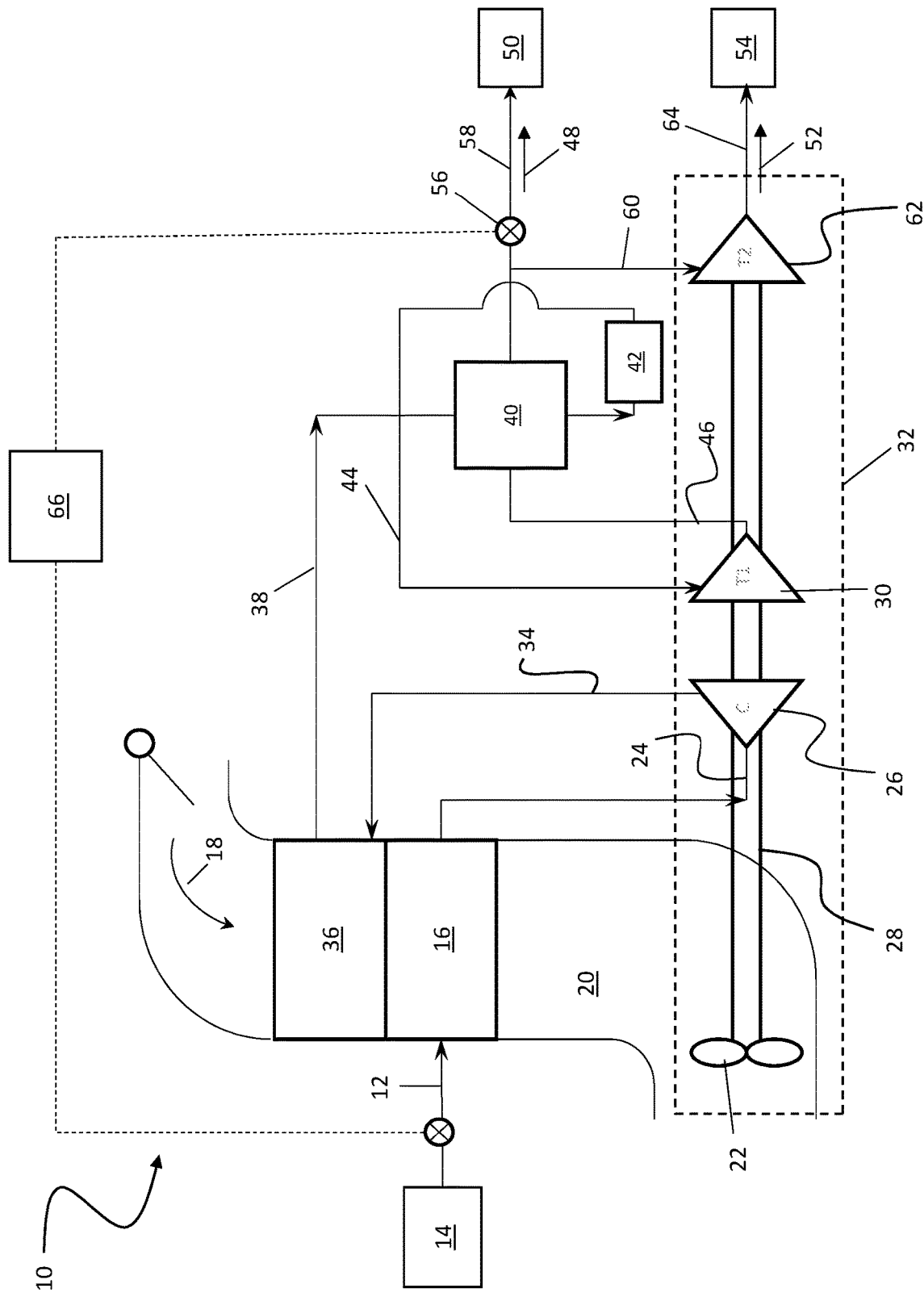
FIG. 1 is a schematic illustration of an embodiment of an aircraft environmental control system (ECS)

Referring to FIG. 1 an environmental control system (ECS) 10 is supplied with a bleed airflow 12 from, for example, a compressor bleed air supply system 14 of a gas turbine engine (not shown). The bleed airflow 12 is input into a primary heat exchanger 16 such that the bleed airflow 12 is in a thermal energy exchange with a ram airflow 18, or an ambient airflow, directed along a ram airflow passage 20. In some embodiments, the ram airflow 18 is driven along the ram airflow passage 20 via a fan 22. The bleed airflow 12 is cooled in the primary heat exchanger 16 via thermal energy exchange with the ram airflow 18, and is communicated along a compressor inlet passage 24 to a compressor 26. The bleed airflow 12 is then compressed to a higher pressure at the compressor 26. In some embodiments, the compressor 26 is located along a common shaft 28 with the fan 22 and a first cooling turbine 30. Together, the fan 22, the compressor 26 and the first cooling turbine 30 define an air cycle machine (ACM) 32.

The compressed bleed airflow 12 exits the compressor 26 and flows along a compressor outlet passage 34 and to a secondary heat exchanger 36, where the compressed bleed airflow 12 is further cooled by thermal energy exchange with the ram airflow 18. The bleed airflow 12, now compressed, cooled and bearing entrained water vapor, exits the secondary heat exchanger 36 and flows along passage 38 to a condensing heat exchanger 40. The condensing heat exchanger 40 is configured to further cool the bleed airflow 12, and thus condenses the entrained water vapor and separates the water into a water extractor 42. The now dehumidified bleed airflow 12 exits the water extractor 42 and is directed to the first cooling turbine 30 through a first turbine inlet passage 44. At the first cooling turbine 30, the bleed airflow 12 is expanded, and the cooled bleed airflow 12 is directed along a first turbine outlet passage 46 and through the condensing heat exchanger 40 a second time, where the bleed airflow 12 is heated to a relatively warm temperature via thermal exchange with the pre-turbine bleed airflow 12 at the condensing heat exchanger 40.

The ECS 10 is configured to provide relatively high pressure first output airflow 48 to, for example, an aircraft cabin 50 to pressurize and condition an environment in the aircraft cabin 50. The ECS 10 also provides second output airflow 52 to other air loads 54 of the aircraft, such as avionics, electronics or other aircraft components and systems which do not require the relatively high pressure cooling airflow, such as the first output airflow. As such, upon exiting the condensing heat exchanger 40 along the first turbine outlet passage 46, the expanded bleed airflow 12 is flowed toward a turbine bypass valve 56.

The turbine bypass valve 56 directs a first portion of the bleed airflow 12 along a first outlet passage 58 as first output airflow 48 toward the aircraft cabin 50 for aircraft cabin pressurization and conditioning. The remaining portion of the bleed airflow 12 not directed by the turbine bypass valve 56 goes to a second turbine inlet passage 60 to a second cooling turbine 62, while the first portion bypasses the second cooling turbine 62. The second portion of the bleed airflow 12 is further expanded and cooled at the second cooling turbine 62, and is then flowed along a second outlet passage 64 to cool the unpressurized air loads 54 as the second output airflow 52. The turbine bypass valve 56 modulates the proportion of bleed airflow 12 directed toward the aircraft cabin 50 and/or the air loads 54 as directed by, for example, an ECS controller 66, which controls operation of the ECS 10.

Figure 2:
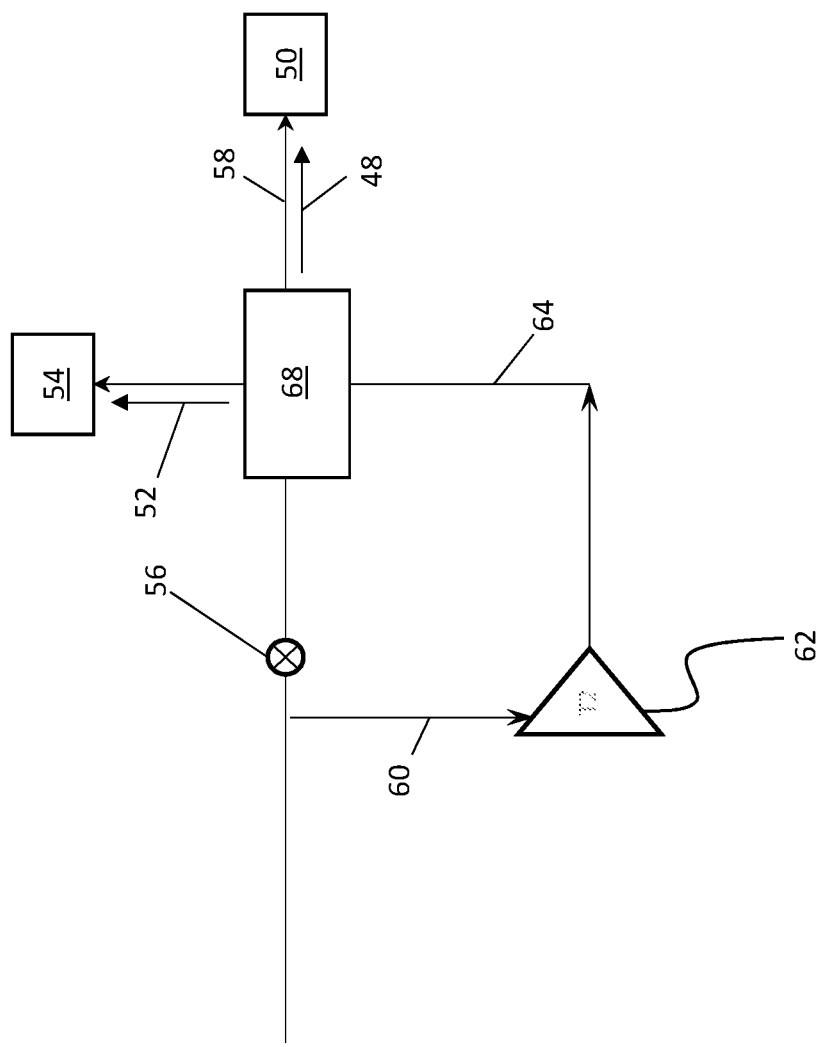
FIG. 2 is a schematic illustration of a portion of an aircraft environmental control system (ECS).

As shown in FIG. 1, in some embodiments the second cooling turbine 62 is mounted on shaft 28. It is to be appreciated, however, that in other embodiments, the second cooling turbine 62 may be located separately from the shaft 28. Further, in some embodiments, such as shown in FIG. 2, it is desired to cool the first output airflow 48 prior to the first output airflow 48 reaching the aircraft cabin 50. As such, an outlet heat exchanger 68 is located downstream of the turbine bypass valve 56. Both the first output airflow 48 and the second output airflow 52 are directed through the outlet heat exchanger 68 where the first output airflow 48 is cooled via thermal energy exchange with the second output airflow 52.

While in the embodiment discussed herein the ECS 10 includes a first cooling turbine 30 and a second cooling turbine 62, this configuration is merely exemplary. Other embodiments of the ECS 10 may have a single cooling turbine or three or more cooling turbines, with a turbine bypass valve 56 located upstream of the last cooling turbine of the ECS 10.

The use of the turbine bypass valve 56 allows for separating outlet airflows into a first output airflow 48 for relatively high pressure cabin pressurization and a second output airflow 52 for air loads not requiring the relatively high pressure airflow of the first output airflow 48. This allows the ECS 10 to utilize an increased cooling turbine pressure ratio at the last cooling turbine beyond the pressurization requirement thereby increasing net turbine cooling of the bleed airflow 12. The increased turbine cooling provides for improved cooling performance of the ECS 10.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system (ECS) for an aircraft comprising:
   at least one cooling turbine; and
   a valve disposed fluidly upstream of a first air load, the valve configured to:
      direct a first portion of an ECS output airflow from the valve to the first air load at a first pressure via a first outlet passage; and
      direct a second portion of the ECS output airflow across a cooling turbine of the at least one cooling turbine via a turbine inlet passage and to a second air load at a second pressure lower than the first pressure for cooling thereof;

wherein the at least one cooling turbine includes a first cooling turbine and a second cooling turbine of the ECS, with the valve configured to:
  direct the first portion of an ECS output airflow from the first cooling turbine to the first air load; and
  direct the second portion of the ECS output airflow across the second cooling turbine and to the second air load;
wherein a compressor is arranged on a common shaft with the first cooling turbine; and
wherein the compressor is fluidly coupled to an outlet of a primary heat exchanger and an inlet of a secondary heat exchanger of the ECS.

2. The environmental control system of claim 1, further comprising an outlet heat exchanger disposed fluidly downstream of the at least one cooling turbine.

3. The environmental control system of claim 2, wherein the first portion of the ECS output airflow and the second portion of the ECS output airflow are directed through the outlet heat exchanger to cool the first portion of the ECS output airflow.

4. The environmental control system of claim 1, further comprising a condensing heat exchanger disposed on a fluid pathway between the first cooling turbine and the second cooling turbine.

5. The environmental control system of claim 1, wherein the first air load is an aircraft cabin.

6. An environmental control system (ECS), comprising:
  a primary heat exchanger;
  a secondary heat exchanger;
    an air cycle machine including a compressor and two or more cooling turbines, the compressor fluidly coupled to an outlet of the primary heat exchanger and an inlet of the secondary heat exchanger, and an outlet of the secondary heat exchanger fluidly coupled to a first cooling turbine or the two or more cooling turbines; and
    a valve disposed fluidly downstream of the first cooling turbine, the valve configured to:
      direct a first portion of an ECS output airflow to a first air load at a first pressure via a first outlet passage; and
      direct a second portion of the ECS output airflow across a second cooling turbine of the two or more cooling turbines and to a second air load at a second pressure less than the first pressure for cooling thereof.

7. The environmental control system of claim 6, further comprising an outlet heat exchanger disposed fluidly downstream of the second cooling turbine.

8. The environmental control system of claim 7, wherein the first portion of the ECS output airflow and the second portion of the ECS output airflow are directed through the outlet heat exchanger to cool the first portion of the ECS output airflow.

9. The environmental control system of claim 6, wherein first cooling turbine and the second cooling turbine are connected by a fluid pathway.

10. The environmental control system of claim 9, further comprising a condensing heat exchanger disposed on the fluid pathway between the first cooling turbine and the second cooling turbine.

11. The environmental control system of claim 6, wherein the compressor, the first cooling turbine and the second cooling turbine are arranged on a common shaft.

12. The environmental control system of claim 6, wherein the first air load is an aircraft cabin.

13. A method of operating an environmental control system (ECS) of an aircraft, comprising:
  flowing a bleed airflow through a primary heat exchanger;
  flowing the bleed airflow from the primary heat exchanger into a compressor of an air cycle machine;
  flowing the bleed airflow from the compressor into a first cooling turbine of the air cycle machine to cool the bleed airflow;
  outputting a first portion of the bleed airflow as a first portion of an ECS output airflow to a first air load at a first pressure via a valve and a first outlet passage by bypassing a second cooling turbine of the air cycle machine; and
  flowing a second portion of the bleed airflow across the second cooling turbine, thereby expanding the second portion of the bleed airflow; and
  outputting the second portion of the bleed airflow as a second portion of the ECS output airflow to a second air load at a second pressure less than the first pressure via a second outlet passage.

\* \* \* \* \*